United States Patent

Chu et al.

[11] Patent Number: 6,115,179
[45] Date of Patent: Sep. 5, 2000

[54] COMPOSITE OPTICAL FILM

[75] Inventors: Cheng-Wei Chu, Taipei-Hsien; Chao-Tsang Wei, Taipei; Rung-Ywan Tsai, Kaohsiung; Fang-Chuan Ho, Hsinchu, all of Taiwan

[73] Assignee: Industrial Technology Research Institute, Hsinchu, Taiwan

[21] Appl. No.: 09/255,761

[22] Filed: Feb. 24, 1999

[30] Foreign Application Priority Data

Nov. 11, 1998 [TW] Taiwan ................................. 87118745

[51] Int. Cl.⁷ ................................. G02B 1/10; F21V 9/04; B32B 17/06
[52] U.S. Cl. ........................... 359/586; 359/580; 359/584; 359/582; 359/359; 428/426
[58] Field of Search ....................... 359/580, 582, 359/584, 586, 587, 588, 589, 350, 355, 356, 357, 358, 359; 428/64.1, 426

[56] References Cited

U.S. PATENT DOCUMENTS 4,940,636 7/1990 Brock et al. ............................. 359/586
5,460,888 10/1995 Hashimoto et al. ..................... 359/586
5,891,542 4/1999 Tominaga et al. ..................... 428/64.1

*Primary Examiner*—Audrey Chang
*Attorney, Agent, or Firm*—Thomas, Kayden, Horstemeyer & Risley

[57] ABSTRACT

A composite optical film with a low refractive index mainly comprises calcium fluoride ($CaF_2$), and silicon dioxide ($SiO_2$) mixed with a specific composition ratio. The composite optical film is formed on a quartz substrate. The composite film is formed by using a coater, which accommodates two individual e-gun sources inside a cylindrical chamber. Oxygen is bled into the chamber. A heating process and plasma formation are performed to assist the process of forming the composite film. Additionally, a laser reflection lenses comprises an optical film with high refractive index and an optical film with low refractive index, which are alternately laminated onto a quartz glass substrate. The optical film with low refractive index uses a composite optical film mainly comprising calcium fluoride ($CaF_2$) and silicon dioxide ($SiO_2$) mixed with a fixed composition ratio.

5 Claims, 6 Drawing Sheets (1 of 6 Drawing Sheet(s) Filed in Color)

CaF2
SiO2:CaF2=10:100
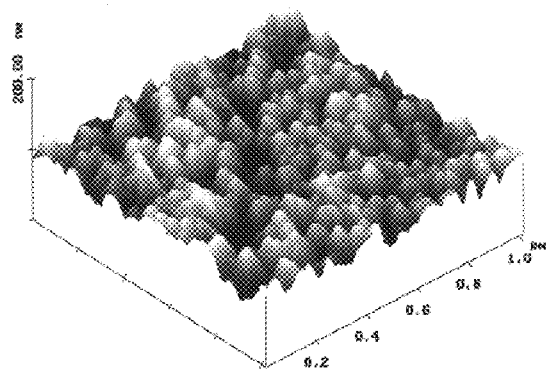
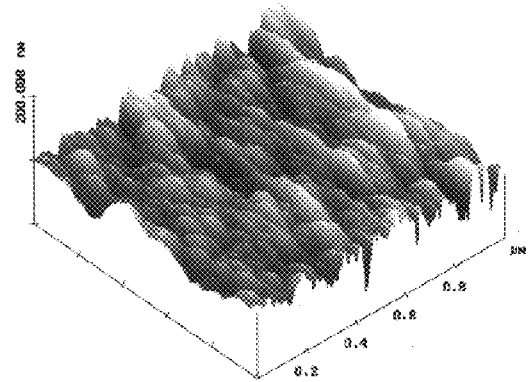
FIG. 5A
FIG. 5B

COMPOSITE OPTICAL FILM

CROSS-REFERENCE TO RELATED APPLICATION

This application claims the priority benefit of Taiwan application serial no. 87118745, filed Nov. 11, 1998, the full disclosure of which is incorporated herein by reference.

BACKGROUND OF THE INVENTION

1. Field of Invention

The present invention relates to a composite optical film. More particularly, the present invention relates to a composite optical film with a low refractive index. The composite optical film can be used in fabrication of a laser reflection lens.

2. Description of Related Art

A laser beam has characteristics of high directionality, monochromaticity, and high brightness. Therefore, the laser beam is widely used, for example in alignment, measurement of distance, thickness, and velocity. The application fields of a laser beam further comprise welding, coevaporation, puncturing, cutting, and optical communication, laser discs, and compact disks. A laser beam can even be applied in medical instruments or equipment. In the practical application, the coating quality of a laser reflection lens is a crucial factor that affects accuracy of a laser device.

A laser reflection lens comprises optical thin films with high refractive index and optical films with low refractive index alternately stacked on a quartz glass substrate. For an argon fluoride (ArF) or a krypton fluoride (KrF) excimer laser device, calcium fluoride ($CaF_2$) is commonly used as a coating material for ultra-violet region. However, a $CaF_2$ film prepared by current coating technique such as alternating magnetic sputtering method and electron-beam coevaporation, poor physical properties and inhlomogeneoity result. The disadvantages include low hardness, porosity, and poor adhesion to the quartz glass substrates.

SUMMARY OF THE INVENTION

Accordingly, the present invention provides a composite optical film with a low refractive index. The composite optical film has an improved adhesion to the substrates. In addition, the composite optical film has an enhanced homogeneity, less porosity, and better moisture resistance.

Additionally, the present invention provides a laser reflection lens, which has higher adhesion to substrates, higher homogeneity, less porosity, and better moisture resistance.

To achieve these and other advantages and in accordance with the purpose of the invention, as embodied and broadly described herein, the invention provides a composite optical film with a low refractive index and provides a method of forming the composite optical film with a low refractive index. The composite optical film comprises calcium fluoride ($CaF_2$), and silicon dioxide ($SiO_2$) mixed with a specific composition ratio according to requirements. After a pre-cleaning step is performed, the composite optical film is formed on a quartz substrate. The composite film is formed by using a coater, which accommodates two individual e-gun sources inside of a cylindrical chamber. Oxygen is bled into the chamber. A heating process and plasma are performed to assist the process of forming the composite film.

The invention provides a laser reflection lens. The laser reflection lens comprises an optical film with high refractive index and an optical film with low refractive index, which are alternately laminated onto a quartz glass substrate. The optical film with low refractive index includes a composite optical film mainly comprising calcium fluoride ($CaF_2$) and silicon dioxide ($SiO_2$) mixed with a specific composition ratio.

It is to be understood that both the foregoing general description and the following detailed description are exemplary, and are intended to provide further explanation of the invention as claimed.

BRIEF DESCRIPTION OF THE DRAWINGS

The file of this patent contains at least one drawing executed in color. Copies of this patent with color drawing (s) will be provided by the Patent and Trademark office upon request and payment of the necessary fee.

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5A shows morphology of pure $CaF_2$ films examined by an atomic force microscope;

FIG. 5B shows morphology of $CaF_2$—$SiO_2$ films examined by an atomic force microscope.

DESCRIPTION OF THE PREFERRED EMBODIMENTS

Figure 1:
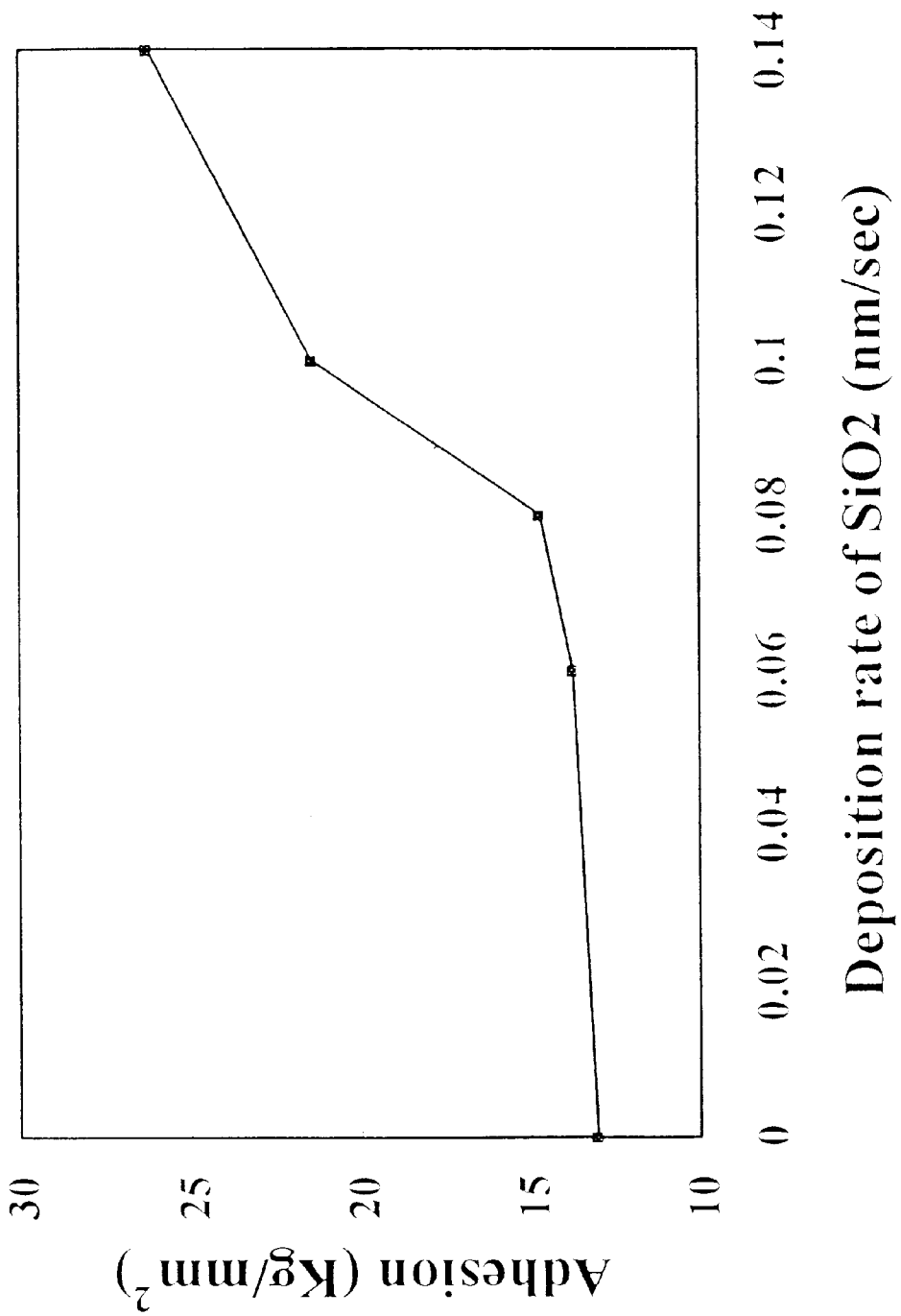
FIG. 1 shows that adhesion strength of $CaF_2$—$SiO_2$ composite films on glass substrates is dependent on deposition rate of $SiO_2$.

Reference will now be made in detail to the present preferred embodiments of the invention, examples of which are illustrated in the accompanying drawings. Wherever possible, the same reference numbers are used in the drawings and the description to refer to the same or like parts.

The invention provides a composite optical film with a low refractive index and a method of forming the composite optical film. The composite optical film is commonly used in fabrication of laser reflection lens. The composite optical film mainly comprises calcium fluoride ($CaF_2$), and silicon dioxide ($SiO_2$) mixed with a specific composition ratio.

A quartz glass substrate is provided. Cleaning steps are performed on the quartz glass substrate. The cleaning steps include, for example, washing the quartz glass substrate with detergent solution, rinsing with de-ionized water, rinsing again with isopropyl alcohol, and blow drying with clean, compressed air.

After the cleaning steps, a deposition step is performed oil the glass substrate to form a $CaF_2$—$SiO_2$ composite film. The $CaF_2$—$SiO_2$ composite film includes, for example, calcium fluoride ($CaF_2$) and silicon dioxide ($SiO_2$) mixed with a specific composition ratio according to requirements. The calcium fluoride ($CaF_2$) and the silicon dioxide ($SiO_2$) can be simultaneously deposited on the glass substrate or alternatively, the calcium fluoride ($CaF_2$) is deposited on the glass substrate first, and followed by depositing the silicon dioxide ($SiO_2$). Thus the $CaF_2$—$SiO_2$ composite film is formed.

The deposition step is performed in a chamber. During the deposition, background pressure of the chamber is pumped below $2 \times 10^{-5}$ mbar and then raised to $1.0 \times 10^{-4}$ mbar, for example. Pure and dry oxygen is bled into the chamber for reactive deposition of the composite film. A plasma is formed to assist the deposition process. A noble (as such as argon (Ar) is bled into the plasma source to be ionized with reacting gas to generate the plasma. Discharge current for maintaining the plasma is about 40 A. Discharge voltage for forming the plasma is about 80 V.

The $CaF_2$—$SiO_2$ composite film can be formed by using a Leybold AG A1140 coater, which accommodates two individual e-gun sources located 88 cm apart inside of the cylindrical chamber. Evaporants for the evaporation of $CaF_2$ and $SiO_2$ with a specific composition ratio are respectively sintered $CaF_2$ pellets and $SiO_2$ granules. The composition ratio of $SiO_2$:$CaF_2$ is equal to or lower than 1:5. The composition ratio is usually measured by atomic percentage (at. %). The pressure of the chamber is ultimately kept at about $3 \times 10^{-4}$ mbar. The temperature of the substrate is kept at about 50° C.

For the $CaF_2$—$SiO_2$ composite film in the invention, the composition ratio of $SiO_2$:$CaF_2$ is equal to the deposition rate ratio of $SiO_2$:$CaF_2$. The composition ratio is preferably from about 1:50 to about 1:5.

After the $CaF_2$—$SiO_2$ composite film is formed, the composite film is examined by an adhesion test, a moisture resistance test and a morphology test. The experimental data of a $CaF_2$—$SiO_2$ composite film with a composition ratio 1:10 of $SiO_2$:$CaF_2$ are as follows to describe the function of the $CaF_2$—$SiO_2$ composite film. This is just an example; any composition ration of $SiO_2$:$CaF_2$ equal to or lower than 1:5 can be used in the invention.

FIG. 1 shows that adhesion strength of $CaF_2$—$SiO_2$ composite films on glass substrates is dependent on deposition rate of $SiO_2$. FIG. 1 shows the results of forming $CaF_2$—$SiO_2$ composite films at a fixed deposition rate (1 nm/sec) of $CaF_2$ and at different deposition rates of $SiO_2$. The x-axis represents deposition rates of $SiO_2$. The y-axis represents adhesion strength of $CaF_2$—$SiO_2$ composite films. While the composite films are formed, the deposition rate of $CaF_2$ is not changed and remains at 1 nm/sec, while the deposition rates of $SiO_2$ are respectively controlled at 0, 0.06, 0.08, 0.1, and 0.14 nm/sec. Adhesion strength is measured with a Sebastian Five-A Z module adhesion tester, for example. As shown in FIG. 1, when the deposition rate of $SiO_2$ is increased to about 0.1 nm/sec, the adhesion strength of the composite film is greatly increased.

Figure 2:
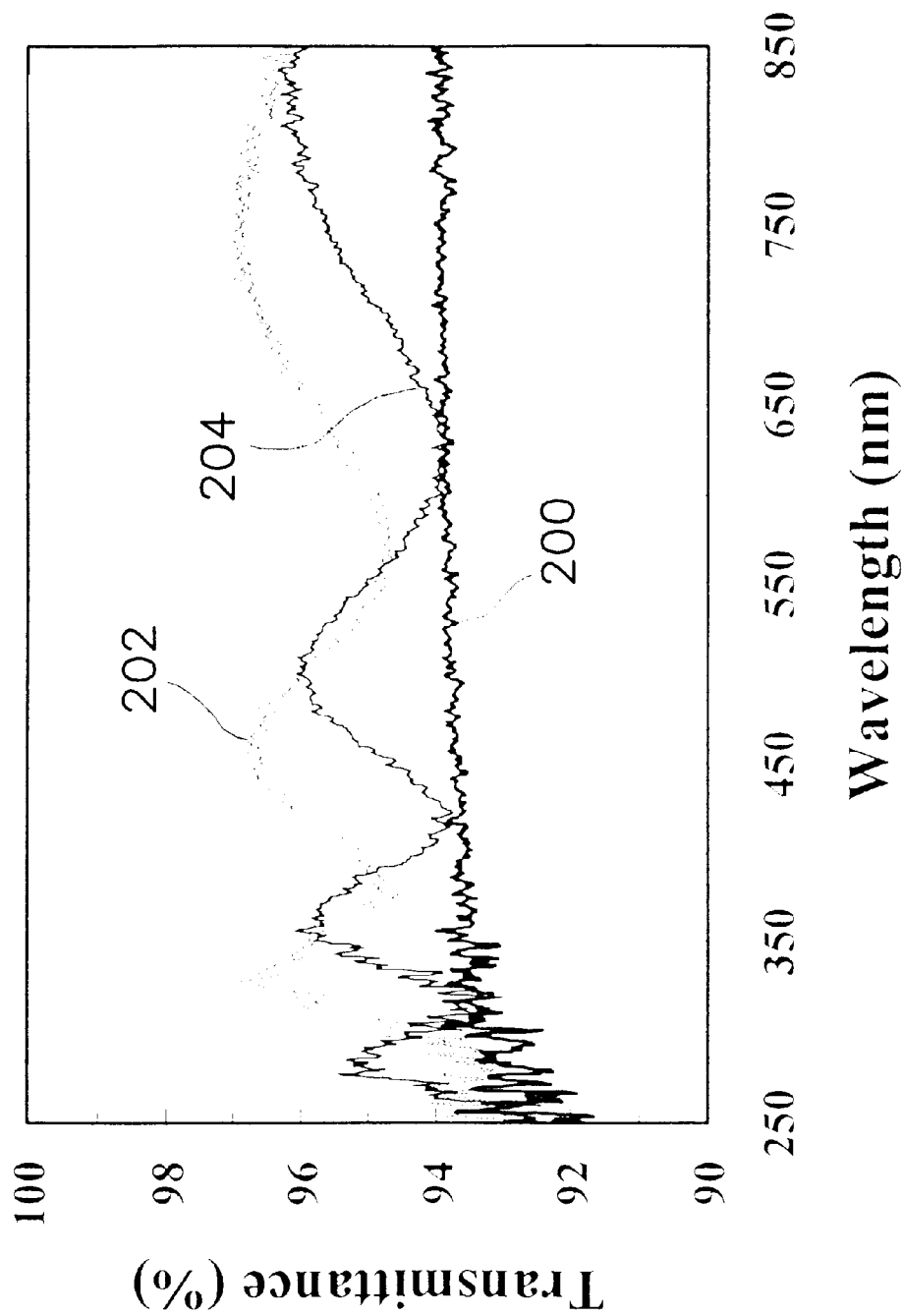
FIG. 2 shows spectral transmittance of a quartz glass substrate, pure $CaF_2$ films and $CaF_2$—$SiO_2$ composite films.

FIG. 2 shows spectral transmittance of a quartz glass substrate, pure $CaF_2$ films and $CaF_2$—$SiO_2$ composite films. The x-axis represents wavelength. The y-axis represents transmittance. The spectral transmittance curves shown in FIG. 2 are measured with a Hitachi model U4001 spectrophotometer, for example. The spectral transmittance curves show the transmittance measured from the wavelength of from 250 nm to 850 nm. The composition ratio of the $SiO_2$:$CaF_2$ composite film is about 1:10. Refractive indices of $CaF_2$—$SiO_2$ composite films are presented in Table 1.

TABLE 1

Refractive indices of $CaF_2$-$SiO_2$ composite films

| Wavelength (nm) | Index |
| --- | --- |
| 277.0 | 1.340 |
| 357.5 | 1.310 |
| 501.0 | 1.309 |
| 840.5 | 1.307 |

In FIG. 2, curve 200 and curve 202 respectively represent transmittance of a quartz glass substrate and transmittance of a pure $CaF_2$ film. Curve 204 represents transmittance of a $CaF_2$—$SiO_2$ composite film. When curve 202 and curve 204 are compared, the spectral curves also imply that the $CaF_2$ film exhibits a significant lack of homogeneity, while the homogeneity of the composite film is greatly improved.

Figure 3:
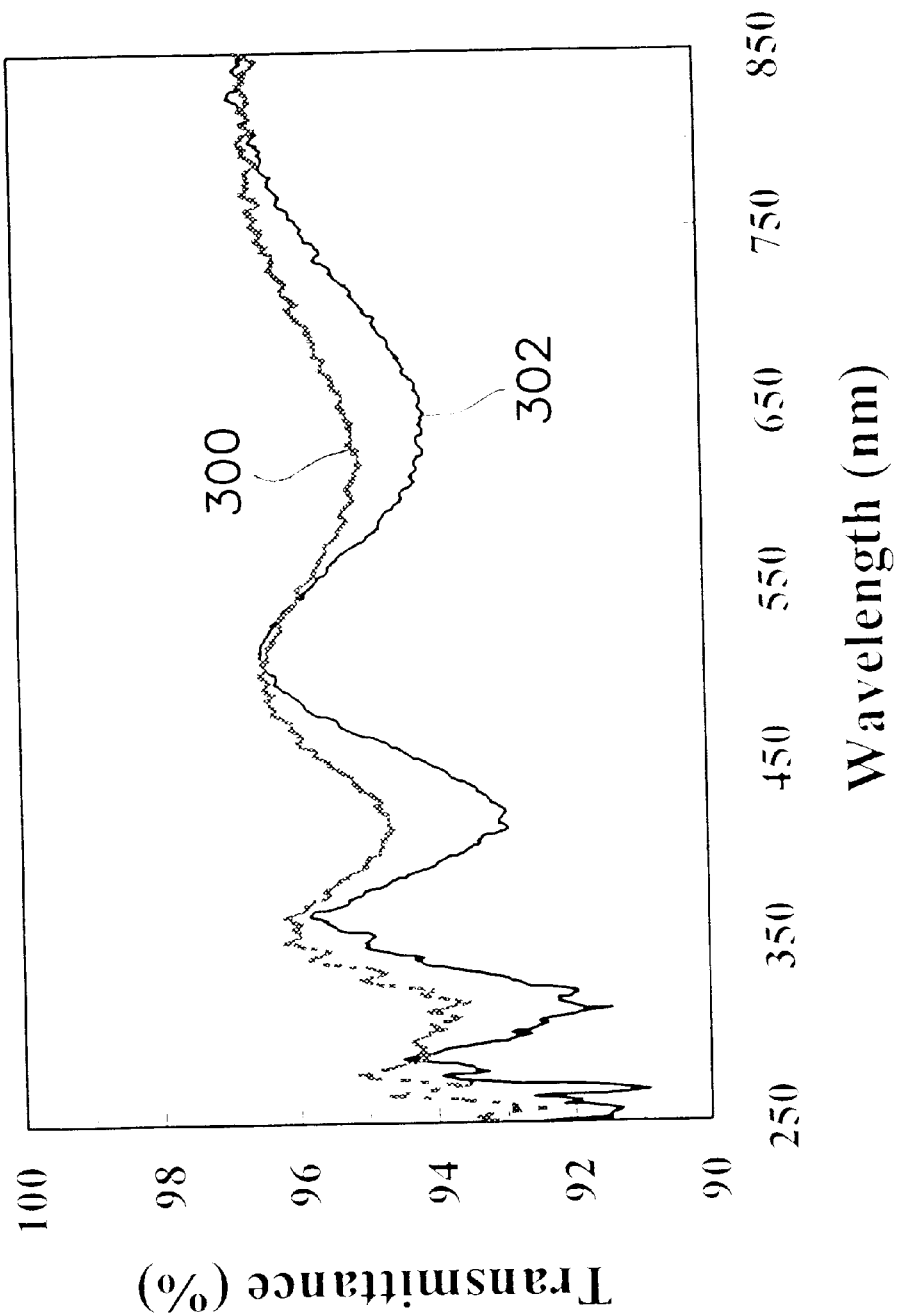
FIG. 3 shows transmittance spectra of pure $CaF_2$ films taken before and after a moisture resistance test.

As shown in FIG. 3, a moisture test is performed. FIG. 3 shows transmittance spectra of pure $CaF_2$ films taken before and after the moisture resistance test. The moisture resistance test dips the optical films into water at room temperature for about 1.5 hours, for example. In FIG. 3, the x-axis represents wavelength, and the y-axis represents transmittance. Curve 300 and curve 302 respectively represent transmittance spectra of pure $CaF_2$ films taken before and after the moisture resistance test.

Figure 4:
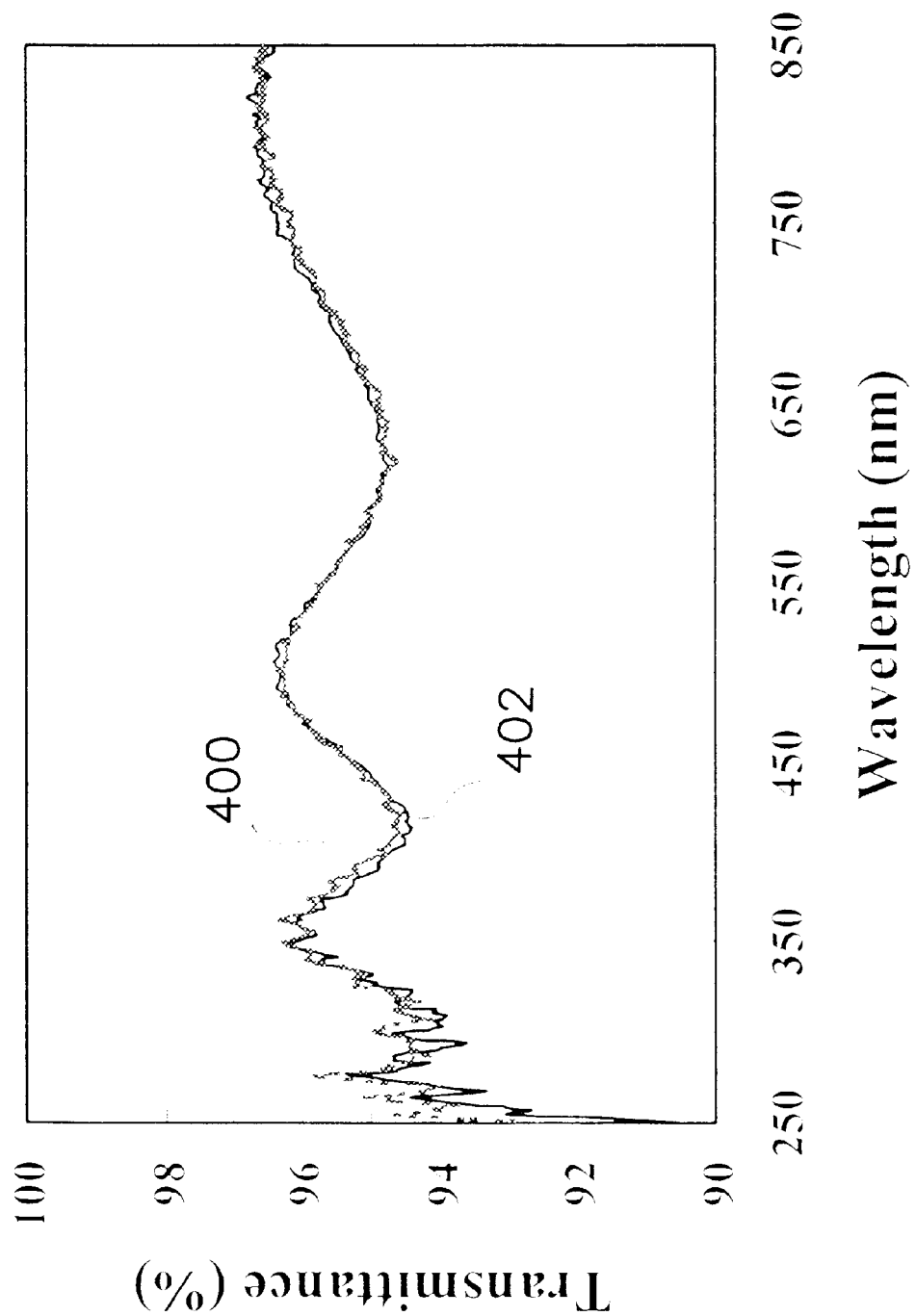
FIG. 4 shows transmittance spectra of $CaF_2$—$SiO_2$ composite films taken before and after a moisture resistance test.

FIG. 4 shows transmittance spectra of $CaF_2$—$SiO_2$ composite films taken before and after a moisture resistance test. As in FIG. 3, the moisture resistance test dips the composite optical films into water at room temperature for about 1.5 hours. The composition ratio of the $SiO_2$:$CaF_2$ composite film is about 1:10. Curve 400 and curve 402 respectively represent transmittance spectra of $CaF_2$—$SiO_2$ composite films taken before and after the moisture resistance test. When FIG. 3 and FIG. 4 are compared, before and after the moisture resistance test, changes of the transmittance spectra of the $CaF_2$—$SiO_2$ composite films are greatly reduced. Therefore, $CaF_2$—$SiO_2$ composite films have better moisture resistance than pure $CaF_2$ films.

Additionally, $CaF_2$—$SiO_2$ composite films are observed with an atomic force microscope (AFM). The experimental results shown in FIG. 5A and FIG. 5B are observed with a Digital Instrument Scanning Probe Microscope Nanoscope E AFM, for example. FIG. 5A shows morphology of pure $CaF_2$ films examined by an atomic force microscope. FIG. 5B shows morphology of $CaF_2$—$SiO_2$ composite films examined by an atomic force microscope. When FIG. 5A and FIG. 5B are compared, the $CaF_2$—$SiO_2$ composite films are more compact and have less porosity.

Figure 6:
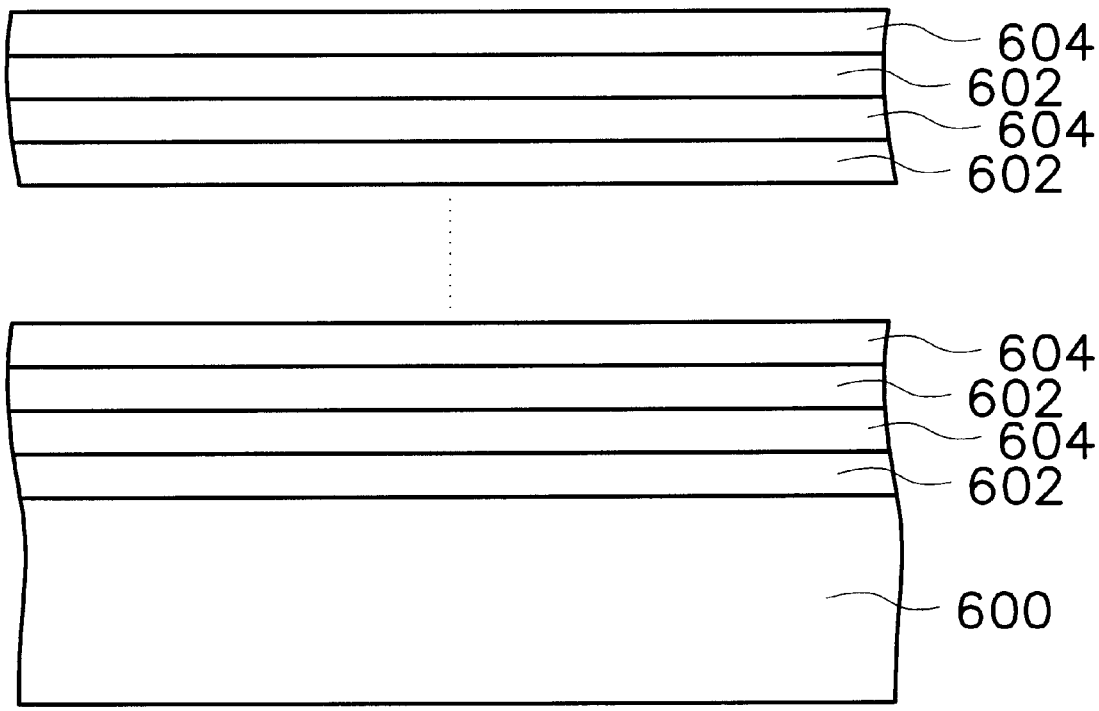
FIG. 6 is a schematic cross-sectional view of a laser reflection lens.

Stacks of optical films with high refractive indices and optical films with low refractive indices are used in fabrication of a laser reflection lens. The laser reflection lens has high reflection and low absorption. Therefore, composite films in the invention are suitable for the laser reflection lens fabrication. As shown in FIG. 6, FIG. 6 is a schematic, cross-sectional view of a laser reflection lens. An optical film with a high refractive index 602 and an optical film with a low refractive index 604 are alternately laminated onto a quartz glass substrate 600 to form a laser reflection lens. The thickness of the alternately laminated stacks can be formed according to requirements of the process. The material of the optical film with high refractive index 602 includes material with high refractive index used in the deep-ultraviolet region, for example, lanthanum fluoride ($LaF_2$) and hafnium oxide ($HfO_2$). The optical film with low refractive index 604 uses a composite optical film of $CaF_2$—$SiO_2$ in the invention. The alternately laminated stacks comprising the optical film with high refractive index 602 and the optical film with low refractive index 604 forms a laser reflection lens. The laser reflection lens can be used in wide wavelength range of from about 190 nm to about 5000 nm.

Accordingly, the composite optical film comprises calcium fluoride ($CaF_2$) and silicon dioxide ($SiO_2$) mixed with a specific composition ratio in the invention. The composition ratio of $SiO_2:CaF_2$ is from about 1:50 to about 1:5. The composite film has a low refractive index (<1.35), higher adhesion to substrates, less porosity, and better moisture resistance. In the wavelength range of from about 190 nm to about 300 nm, the features of the composite optical film in the invention include:

1. an average refractive index equal to or lower than 1.35
2. better transmittance and better homogeneity
3. better environmental resistance
4. better mechanical properties It will be apparent to those skilled in the art that various modifications and variations can be made to the structure of the present invention without departing from the scope or spirit of the invention. In view of the foregoing it is intended that the present invention cover modifications and variations of this invention provided they fall within the scope of the following claims and their equivalents.

What is claimed is:

1. A composite optical film with a low refractive index, formed on a quartz glass substrate, comprising calcium fluoride ($CaF_2$) and silicon dioxide ($SiO_2$) mixed with a specific composition ratio of $SiO_2:CaF_2$ in atomic percentage, wherein the specific composition ratio of $SiO_2:CaF_2$ is from about 1:50 to about 1:5.

2. A method of forming a composite optical film on a quartz glass substrate, wherein a pre-cleaning step is performed on the quartz glass substrate, the method comprising:

performning a deposition process in a chamber to deposite calcium fluoride ($CaF_2$) and silicon dioxide ($SiO_2$) with a specific composition ratio in atomic percentage on the quartz glass substrate to form a $CaF_2$—$SiO_2$ composite film, wherein the specific composition ratio of $SiO_2:CaF_2$ is from about 1:50 to about 1:5.

3. A laser reflection lens, formed on a quartz glass substrate, comprising:

a plurality of optical films with high refractive index; and a plurality of optical films with low refractive index, wherein the optical films with low refractive index use composite optical films comprising calcium fluoride ($CaF_2$) and silicon dioxide ($SiO_2$) mixed with a specific composition ratio of $SiO_2:CaF_2$ in atomic percentage, wherein the specific composition ratio of $SiO_2:CaF_2$ is from about 1:50 to about 1:5;

wherein the optical films with high refractive index and the optical films with low refractive index are alternately laminated onto the quartz glass substrate.

4. The laser reflection lens according to claim 3, wherein the optical films with high refractive index include lanthanum fluoride ($LaF_2$).

5. The laser reflection lens according to claim 3, wherein the optical films with high refractive index include hafnium oxide ($HfO_2$).

* * * * *